United States Patent Office 3,447,361
Patented June 3, 1969

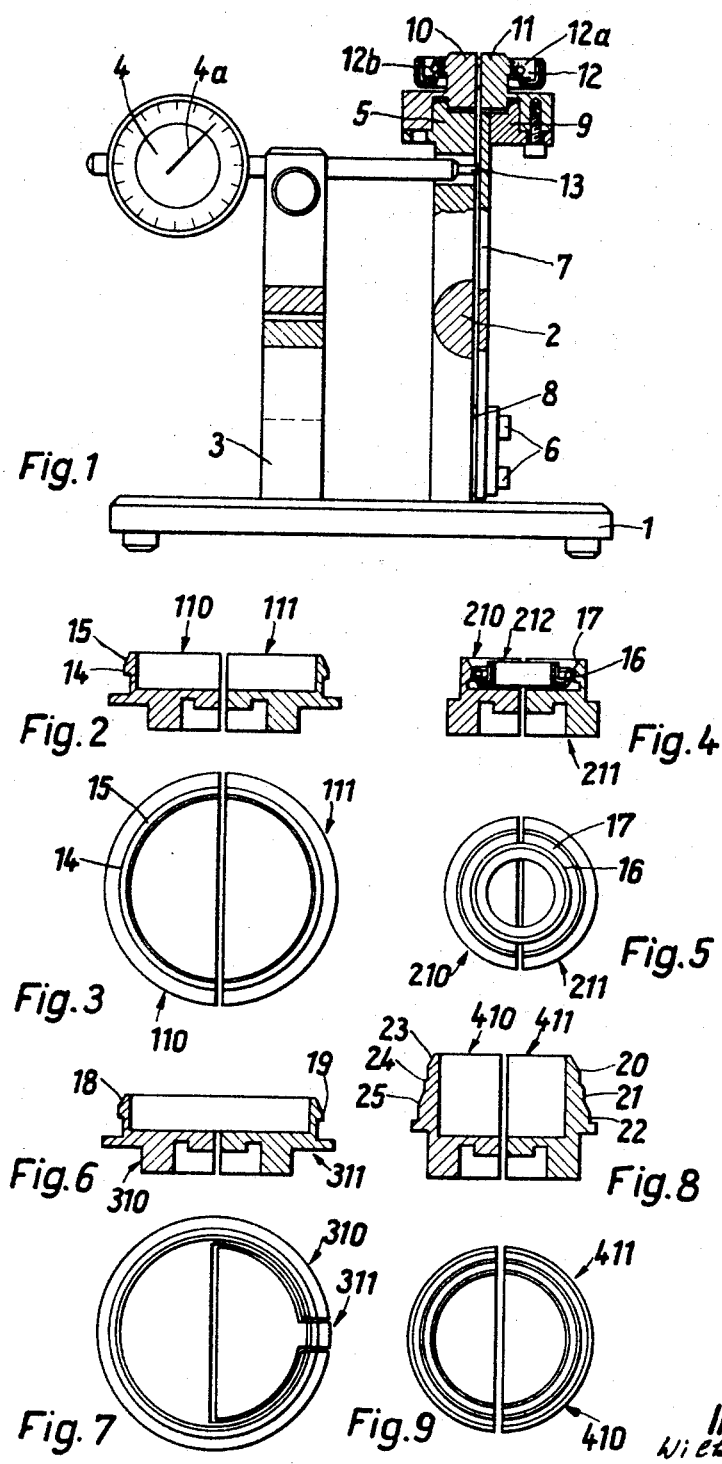

3,447,361
METHOD AND APPARATUS FOR TESTING FLUID SEALS OR THE LIKE
Wilhelm Schmitt, Erbach, near Heppenheim, Germany, assignor to Carl Freudenberg, Weinheim, Germany
Filed Jan. 30, 1967, Ser. No. 612,553
Claims priority, application Germany, Jan. 31, 1966, F 48,300
Int. Cl. G01n 3/08
U.S. Cl. 73—88
14 Claims

ABSTRACT OF THE DISCLOSURE

Apparatus for testing radial pressure between annular elastic fluid seals and the surfaces within which or onto which the seals are placed. Comprises two jaws one of which is rigid and the other of which is spring-mounted. The jaws define a conical surface along which a seal to be tested is moved axially to undergo radial deformation and to effect minute displacement of the spring-mounted jaw. A gauge measures the displacement and indicates the pressure between the seal and the jaws.

BACKGROUND OF THE INVENTION

The present invention relates to a method and apparatus for testing of gaskets, packings, analogous annular fluid seals or other ring-shaped articles which consist, at least in part, of elastomeric material, such as rubber, metal and/or plastic. More particularly, the invention relates to a method and apparatus for determining the counterpressure exerted by elastic annular articles under the conditions corresponding to those when such articles are in actual use.

When in use, an annular fluid seal is normally subjected to axial and/or radial deforming stresses, depending upon whether it serves to seal a gap between a pair of annular surfaces which are disposed end-to-end or to seal a gap between two surfaces one of which surrounds the other. The present invention is concerned mainly with testing of seals or analogous elastic annular articles which undergo radially oriented compressive or expanding stresses. Such seals may be used to prevent leakage of fluid along a cylindrical internal or external surface, for example, to prevent bleeding of liquid or gaseous media along the peripheral surface of a piston or shaft, or to prevent leakage of fluids along the internal surface of a cylinder or the like. Accurate determination of radial pressures transmitted by fluid seals against the adjoining surfaces is of importance in the construction and testing of hydraulically and/or pneumatically operated equipment.

In accordance with presently prevailing practice, radial counterpressure of an elastic annular fluid seal is determined by subjecting a deformed seal to progressively increasing fluid pressure until the seal ceases to prveent leakage of fluid. Such methods of testing are utilized to determine the sealing action of annular sealing lips on packings, gaskets and like ring-shaped seals. The seal is subjected to radial deformation which corresponds to deformation in actual use, and the difference in pressures at the opposite sides of the seal is increased until the seal ceases to prevent flow of fluid from the higher- to the lower-pressure side. As a rule, the testing fluid is air or another gas. A serious drawback of such testing methods is that the pressure at which the seal ceases to prevent leakage of fluid does not depend solely upon radial pressure which is exerted by the seal against an internal or external surface but also upon several other factors. Thus, the deformability of a seal in the axial direction need not be the same as in the radial direction, the material of the seal might not be sufficiently homogeneous in all zones of the seal, and maximum resistance to axial deformation need not be idential with maximum resistance to radial deformation.

It is also known to test elastic annular fluid seals by resorting to a split mandrel. The seal is applied around the mandrel and the latter is then caused to expand the seal radially to the same extent as when the seal is in actual use. A suitable gauge measures the force which is necessary to effect spreading of the mandrel, and the result of measurement is utilized to calculate the radial pressure between the mandrel and the thus deformed seal. However, such testing method also exhibits several serious drawbacks, mainly because the testing operation is not sufficiently accurate since the force required to spread the mandrel is not truly reflective of the radial pressure between the surface of the mandrel and the adjoining surface of the deformed seal. This is due to the fact that, during radial expansion, the spreading force applied to the mandrel must also overcome substantial frictional forces between the mandrel and the seal; therefore the force required to spread the mandrel is not proportional to radial pressure between the mandrel and the seal. Furthermore, such frictional forces prevent uniform expansion of the seal in each zone of its elastic material so that the radial pressure varies from zone to zone.

Accordingly, it is an important object of the present invention to provide a novel and improved method of determining the radial pressure between a radially deformed annular elastic article and the deforming surface in such a way that the results of tests will be truly reflective of the actual magnitude of such pressure.

Another object of the invention is to provide a method of testing the radial pressure of an elastic annular fluid seal or the like under circumstances which are identical with or closely approximate the conditions of actual use, and wherein the radial pressure of successive annular articles can be determined in rapid sequence and by persons having little technical skill.

A further object of the invention is to provide a method of the above outlined characteristics which can be utilized for testing of articles consisting of a wide variety of elastomeric materials while such articles are subjected to radially inwardly directed compressive or radially outwardly directed expending stresses.

An additional object of the invention is to provide a method according to which radial pressure between a fluid seal or the like and the surface which is sealed thereby can be determined simultaneously with determination of one or more other important characteristics of the tested article.

A concomitant object of the invention is to provide a simple, compact, reliable and rugged testing apparatus which may be utilized in the practice of my method and to construct and assemble the apparatus in such a way that it can be rapidly converted for testing of differently dimensioned, configurated, stressed and/or produced elastic annular articles.

A further object of the invention is to provide the testing apparatus with a novel testing unit which can come in direct contact with tested articles and which can be used and reused as long and as frequently as desired.

SUMMARY OF THE INVENTION

One feature of my invention resides in the provision of a method of determining radial counterpressure exerted by elastic annular articles in response to radial deformation. The method comprises the steps of moving an article axially and simultaneously deforming the moving article radially whereby the elastic material of the article offers a varying resistance to radial deformation, terminating axial movement of the article when its radial deformation corresponds to anticipated deformation in actual use, and comparing the resistances offered by the article to radial deformation upon and prior to termination of axial movement, preferably upon termination and prior to start of axial movement.

More specifically, the step of deforming the article radially preferably includes subjecting selected portions of an annular surface of the article to pressures of different magnitude. The comparing step then involves comparing the extent of deformation of the elastic material of the article along such selected portons of the annular surface which is tantamount to comparing the resistances offered by the article to radial deformation prior to and upon termination of axial movement.

The articles may be subjected to radially inwardly or radially outwardly directed deforming stresses.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a somewhat schematic side elevational view of a testing apparatus which embodies one form of my invention and certain portions of which are shown in section;

FIG. 2 is an axial section through a two-piece testing unit which can be utilized in the testing apparatus of FIG. 1 to determine radial counterpressure exerted by fluid seals or the like in response to radial expansion;

FIG. 3 is a top plan view of the structure shown in FIG. 2;

FIG. 4 is an axial section through a testing unit which can be used to determine radial counterpressure exerted by annular fluid seals or the like in response to radially inwardly directed compressive stresses;

FIG. 5 is a top plan view of the structure shown in FIG. 4;

FIG. 6 is an axial section through a further testing unit;

FIG. 7 is a top plan view of the testing unit shown in FIG. 6;

FIG. 8 is an axial section through another testing unit; and

FIG. 9 is a top plan view of the structure shown in FIG. 8.

DESCRIPTION OF THE PREFERRED EMBODIMENTS

Referring first to FIG. 1, there is shown a testing apparatus which comprises a frame or support including a base plate 1 and two upstanding rigid columns 2 and 3. The upper portion of the column 3 carries a micrometer gauge 4 whose scale is calibrated and cooperates with a rotary pointer 4a to indicate minute displacements of a movable testing member or jaw 11. The upper portion of the column 2 carries a fixed holder 5 of substantially semicircular outline. In the illustrated embodiment, the holder 5 is integral with the column 2. A second semicircular holder 9 is adjacent to and is movable toward and away from the holder 5. Both holders are located at the same level and their purpose is to support a detachable testing unit which resembles a two-piece chuck and includes two substantially semicircular testing members or jaws 10, 11. The jaw 10 is mounted on the fixed holder 5 and the jaw 11 is mounted on the movable holder 9. The latter is mounted at the upper end of a strong leaf spring 7 whose lower end is affixed to the lower portion of the column 2 by screws or analogous fasteners 6. The leaf spring 7 is parallel with the column 2 and is separated therefrom by a removable spacer here shown as a strip 8 of metallic foil or analogous sheet stock. The jaws 10, 11 are detachable from the respective holders 5, 9 so that the apparatus of FIG. 1 can be readily converted for testing of differently dimensioned, configurated and/or assembled fluid seals or analogous annular elastic articles. As a rule, the apparatus will be furnished with several sets of jaws which can be used for testing of radially compressible or radially expansible fluid seals or the like. FIG. 1 shows an annular fluid seal 12 having an annular elastic lip 12a of rubber or plastic which bears against the external surfaces of the jaws 10, 11 under the bias of a coiled metallic spring 12b. The jaws 10, 11 can expand the seal 12 from within, i.e., they correspond to a piston rod or a shaft on which the seal 12 is mounted in actual use to prevent leakage of fluid along the peripheral surface of the piston rod or shaft.

When the article to be tested is applied around the external surfaces of the jaws 10, 11, it undergoes radial expansion from inside because the composite surface including the external surfaces of the jaws 10, 11 tapers upwardly, as viewed in FIG. 1. The initial radial deformation of the seal 12 is zero, and its final radial deformation corresponds to that which is anticipated in actual use. In other words, when the axial (downward) movement of the seal 12 is terminated and the seal assumes the position shown in FIG. 1, the pressure between the internal annular surface of its lip 12a and the external surfaces of the jaws 10, 11 is the same as when the seal 12 is in actual use. The jaw 10 cannot yield because it is mounted on the holder 5 which is integral with the rigid column 2. However, the jaw 11 is mounted on the leaf spring 7 and yields to a small extent to thereby displace the upper portion of the spring 7 in a direction toward the column 3. The gauge 4 has a sensing pin 13 which abuts against the upper portion of the spring 7 and causes an angular displacement of the pointer 4a with reference to the scale so that the operator can observe the deformation of spring 7 and is immediately aware of the radial pressure between the deformed seal 12 and the surfaces of the jaws 10, 11. The pin 13 extends through a suitable opening in the column 2. The scale of the gauge 4 is preferably graduated in such a way that it furnishes readings in pounds per square inch or in other suitable units which indicate the radial pressure. It can be said that the gauge 4 compares the initial radial pressure between the jaws 10, 11 and seal 12 (in the latter's unstressed condition) with the radial pressure when the axial movement of seal 12 to the position shown in FIG. 1 is terminated. It can also be said that the jaws 10, 11 subject the adjoining portions of the internal annular surface of the lip 12a to pressures of different magnitude (the jaw 10 is fixed and exerts a greater pressure than the jaw 11 which is yieldable), and that the measuring or gauging step includes comparing the extent of deformation of elastic material along the surface of the jaw 10 with the extent of deformation of elastic material along the surface of the jaw 11.

The bias of the leaf spring 7 is preferably selected in such a way that the leftward movement of the jaw 11 is in the order of one or more microns, i.e., a very small fraction of the extent of radial expansion of the seal 12 during axial movement to the position of FIG. 1. This insures that all zones of the lip 12a undergo substantially identical expansion and such uniformity of expansion is further enhanced by the fact that the lip 12a expands or is deformed radially outwardly in response to axial movement from the smaller-diameter end toward the larger-diameter end of a conical surface defined by the outer surfaces of the jaws 10 and 11.

It is clear that the testing apparatus may be provided with a suitable recording device which can be utilized as a substitute for or in addition to the gauge 4. For example, the stylus of the recording device can receive motion from the sensing pin 13 to plot a curve on a travelling sheet-like carrier. The displacement of the pointer 4a in the gauge 4 or of the stylus in a recording device is directly proportional to radial counterpressure which the seal 12 exerts in response to deformation at the time the internal diameter of its lip 12a has been increased to the same extent as under the conditions of actual use.

FIGS. 2 and 3 show two substantially semicircular testing members or jaws 110, 111 which can be utilized as substitutes for the jaws 10, 11 of FIG. 1. These jaws are also intended to expand an annular fluid seal or an analogous elastic ring-shaped article from within, and their external surfaces taper upwardly, as viewed in FIG. 2, so that an article which is pushed downwardly undergoes radial expansion from inside. The median portions of external surfaces on the jaws 110, 111 are of semicylindrical shape, as shown at 14, and such surfaces together form a truly cylindrical surface whose diameter equals that of the surface on a shaft or rod on which the articles tested by jaws 110, 111 are put to actual use. Thus, and by disregarding the minute displacement of jaw 111 toward the jaw 110, the radial pressure between the surfaces 14 and the article which surrounds such surfaces is the same as between the articles and a shaft or rod in actual use. During travel along the conical surfaces 15 of the jaws 110, 111, the article will move axially and will simultaneously undergo radial deformation. Such radial deformation will be uniform in each zone of the article, and this is attributed to the fact that expansion takes place during axial movement along a conical surface. Such expansion of the article is much more uniform and more satisfactory for accurate testing than an expansion by means of the aforementioned mandrel which is caused to spread subsequent to introduction into an annular article. In the apparatus utilizing the jaws 10, 11 or 110, 111, the articles are moved from the smaller-diameter end toward the larger-diameter end of the conical surface and come to rest while engaging a cylindrical surface at the larger-diameter end of the conical surface.

FIGS. 4 and 5 illustrate a third testing unit which can be used in the testing apparatus of FIG. 1 and comprises two substantially semicircular jaws 210, 211. The jaw 210 is fixed and the jaw 211 is movable toward and away from the jaw 210 in the same way as described for the jaw 11 of FIG. 1. These jaws are used for effecting radial compression of a fluid seal 212 which comprises an annular outer lip and a helical spring surrounded by such lip. The jaws 210, 211 have internal conical surfaces 17 which taper downwardly to effect radially inwardly directed deformation of the seal 212, and semicylindrical internal surfaces 16 which together form a true cylinder at the smaller-diameter ends of the conical surfaces 17. Radial compression of the seal 212 within the confines of the cylindrical surfaces 16 corresponds to actual compression in the bore of a cylinder or the like. Thus, when the jaws 210, 211 are installed in the holders, 5, 9 of FIG. 1, the pointer 4a of the gauge 4 will be deflected to the other side of its neutral position because the seal 212 will cause the jaw 211 to move away from the jaw 210. Alternatively, the gauge 4 may be shifted to a position to the right of the spring 7, depending on its construction, i.e., whether or not the pointer 4a can travel to both sides of its normal neutral or zero position. The sensing pin 13 is biased against the leaf spring 7 with a very small force so that, when the apparatus is not in use, the pointer 4a automatically remains in normal neutral position. The articles are moved from the larger-diameter end toward the smaller-diameter end of the conical surface.

FIGS 6 and 7 illustrate a further testing unit which includes jaws 310, 311. These jaws are constructed in such a way that they can determine radial pressure between selected and relatively small portions of an annular fluid seal or the like and the adjoining external surface of a piston rod or the like. As clearly shown in FIG. 7, the jaw 310 (which is fixed) forms almost a complete annulus and the jaw 311 forms a small insert in the gap between the ends of the jaw 310. The external surfaces of the jaws 310, 311 include upwardly tapering conical portions 18 and semicylindrical portions 19 at the lower ends of the conical portions 18 in the same way as described in connection with FIGS. 2 and 3. However, the surface portions 18, 19 on the jaw 310 are considerably greater than the corresponding surface portions of the jaw 311. When a fluid seal or another elastic annular article is moved axially over the conical portions 18, it undergoes radial deformation from within and such deformation is terminated when the article surrounds the semicylindrical surfaces 19. The radial pressure between the article and the jaws 310, 311 is then the same as that when the article is in actual use. The jaw 311 will yield by moving radially inwardly and the gauge indicates the extent of such radially inwardly directed movement in units which represent units of radial pressure. The article can be tested again and again, always in a different angular position so that the jaw 311 is moved radially inwardly in response to engagement with different portions of the article. In this way, the operator can determine whether or not the characteristics of the article are the same in each of its portions, as seen in the circumferential direction of the article. The angle of engagement between the article and the movable jaw 311 may be a very small fraction of 180 degrees, for example, in the range of 5–20 degrees. Differences in radial pressure between an article and the surface on which the article is expanded can result from differences in thickness of the article or from non-circular shape of a spring, such as the spring 12b shown in FIG. 1. It is clear that each testing unit can be used with equal advantage for testing the radial pressure of helical springs, of gaskets made of rubber or elastic plastic but without spring, or for testing of gaskets, packings or analogous fluid seals which consist in part of elastic and in part of non-elastic material.

In accordance with a further feature of my invention, determination of radial pressure between an elastic fluid seal or the like and an external or internal deforming surface may be carried out in addition to another testing operation. For example, the testing apparatus may be constructed and assembled in such a way that the operator can determine the internal and/or external diameter of a fluid seal in unstressed condition.

As shown in FIGS. 8 and 9, the testing unit of such testing apparatus may comprise two testing jaws 410, 411 whose exterior is provided with several stepped arcuate surfaces which are in part conical and in part semicylindrical. The semicylindrical surfaces 20, 21, 22 alternate with conical surfaces 23, 24, 25, the conical surface 23 being located at the upper end of the respective jaw. Each of the conical surfaces 24, 25 constitutes a transition between a smaller-diameter and a larger-diameter semicylindrical surface. The diameter of the composite cylindrical surface constituted by the semicylindrical surfaces 20 equals the minimum acceptable diameter of a seal in unstressed condition. Thus, and if the gauge 4 does not indicate any radial pressure when a seal is applied around the surfaces 20, the seal is satisfactory and the testing operation can be continued to determine the radial pressure under circumstances corresponding to the condition of the seal in actual use. If the gauge 4 indicates radial pressure between a seal and the surfaces 20, the seal can be discarded without further testing.

The diameter of the composite cylindrical surface formed by the semicylindrical surfaces 21 corresponds to maximum permissible internal diameter of a seal in unstressed condition. Thus, if the radial pressure between a seal which has been moved axially over the surfaces 23, 20, 24 and onto the surfaces 21 is not within a desired predetermined range, the internal diameter of the ring in unstressed condition is too large and no further testing of the seal is necessary. In other words, if the pointer 4a of the guage 4 is not displaced at all when the seal is applied around the surfaces 21, the internal diameter of the seal in unstressed condition is too large or the resistance to radial expansion of the seal is too small.

A satisfactory seal is thereupon moved axially along the conical surfaces 25 and is applied around the semi-cylindrical surface 22. The diameter of the cylindrical surface which includes the surfaces 22 corresponds to the diameter of a surface which is to be sealed by the tested article in actual use. The deflection of the pointer 4a then indicates the exact radial pressure between the seal and the surface 22 under the same circumstances as in actual use.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A method for determining radial counterpressure which is exerted by elastic annular articles in response to radial deformation, said method comprising the steps of radially deforming an annular article by moving the latter through a predetermined distance only in axial direction along a tapering annular surface one portion of which is movable with respect to the remaining portion so as to yield in response to counterpressure exerted by the article in the course of said radial deformation occurring during axial movement of said article along said tapering surface; applying against said movable surface a pressure which is weaker than said counterpressure so that said movable surface portion yields radially to an extent which is indicative of the resistance offered by said article to deformation in response to axial movement; and measuring the extent of displacement of said movable surface portion form a position at the start to a position upon termination of axial movement of the article.

2. A method as defined in claim 1, wherein said first mentioned step includes placing the article around the smaller-diameter end of a tapering annular surface and moving the article toward the larger-diameter end of such surface so that the article expands and its internal diameter increases.

3. A method as defined in claim 1, wherein said first mentioned step includes placing the article within the larger-diameter end of a tapering annular surface and moving the article toward the smaller-diameter end of such surface so that the article undergoes radial compression and its external diameter decreases.

4. Apparatus for determining radial counterpressures exerted by elastic annular articles in response to radial deformation, comprising a pair of testing members having registering surfaces together forming a conical surface along which the tested article is movable axially in a direction from one end toward the other end of said conical surface whereby the article undergoes radial deformation and exerts against said registering surfaces a counterpressure whose magnitude varies in response to axial movement, one of said testing members being movable with reference to the other testing member; biasing means arranged to oppose movement of said one testing member in response to counterpressure exerted by the article against the surface of said one testing member with a force which is weaker than said counterpressure whereby the displacement of said one testing member is indicative of the magnitude of such counterpressure; and measuring means for measuring the extent of displacement of said one testing member.

5. Apparatus as defined in claim 4, wherein said registering surfaces are constituted by external surfaces of said testing members and wherein the articles are arranged to move axially from the smaller-diameter end toward the larger-diameter end of said conical surface to undergo radial expansion from within.

6. Apparatus as defined in claim 4, wherein said registering surfaces are constituted by internal surfaces of said testing members and wherein the articles are arranged to move axially from the larger-diameter end toward the smaller-diameter end of said conical surface to undergo radial compression from without.

7. Apparatus as defined in claim 4, wherein the diameter of said conical surface at said other end thereof at least approximates the diameters of surfaces which effect deformation of articles in actual use.

8. Apparatus as defined in claim 7, wherein the diameter of said conical surface at said one end thereof equals the internal or external diameter of an article in unstressed condition thereof.

9. Apparatus as defined in claim 8, wherein said biasing means comprises a leaf spring having a fixed end and a second end attached to said movable holder.

10. Apparatus as defined in claim 4, further comprising a fixed holder for said other testing member and a movable holder for said one testing member, said biasing means being arranged to oppose movement of said one testing member through the intermediary of said movable holder.

11. Apparatus as defined in claim 10, wherein each of said testing members is constituted by a jaw which is detachable from the respective holder.

12. Apparatus as defined in cliam 4, wherein the surface on said other testing member is greater than the surface on said one testing member.

13. Apparatus as defined in claim 4, wherein said conical surface includes a plurality of axially staggered portions and wherein said testing members define at least one cylindrical surface between said axially staggered portions.

14. Apparatus as defined in claim 4, wherein said testing members further define a cylindrical surface adjacent to said other end of said conical surface.

References Cited

UNITED STATES PATENTS

| | | | |
|---|---|---|---|
| 3,030,800 | 4/1962 | Dega | 73—46 XR |
| 3,271,995 | 9/1966 | Baumler | 73—9 |
| 3,286,512 | 11/1966 | Jagger, et al. | 73—88 |

CHARLES A. RUEHL, *Primary Examiner.*

U.S. Cl. X.R

73—9